(12) United States Patent
Miyashita (10) Patent No.: US 7,440,770 B2
(45) Date of Patent: Oct. 21, 2008

(54) PORTABLE INFORMATION INPUT APPARATUS

(75) Inventor: Toshikazu Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 65 days.

(21) Appl. No.: 10/973,742

(22) Filed: Oct. 25, 2004

(65) Prior Publication Data

US 2005/0059441 A1 Mar. 17, 2005

Related U.S. Application Data

(63) Continuation of application No. 09/625,052, filed on Jul. 24, 2000, now Pat. No. 6,909,906.

(30) Foreign Application Priority Data

Jul. 23, 1999 (JP) ................................. 11-208312

(51) Int. Cl.
*H04B 1/38* (2006.01)
*G09G 5/08* (2006.01)

(52) U.S. Cl. ................ 455/550.1; 455/575.1; 455/90.1; 345/163; 345/169

(58) Field of Classification Search ............. 455/550.1, 455/575.1, 90.1–90.3, 556.1, 557, 74; 345/163–169, 345/173, 211–213
See application file for complete search history.

(56) References Cited

U.S. PATENT DOCUMENTS

| 5,251,329 | A | | 10/1993 | Takagi et al. |
| 5,706,031 | A | * | 1/1998 | Brendzel et al. ............ 345/172 |
| 5,943,625 | A | | 8/1999 | Yeom et al. |
| 6,035,214 | A | | 3/2000 | Henderson |
| 6,035,350 | A | * | 3/2000 | Swamy et al. ................ 710/73 |
| 6,137,479 | A | * | 10/2000 | Olsen et al. ................ 345/169 |
| 6,259,932 | B1 | | 7/2001 | Constien |
| 6,392,634 | B1 | | 5/2002 | Bowers et al. |
| 6,400,353 | B1 | | 6/2002 | Ikehara et al. |
| 6,909,906 | B1 | * | 6/2005 | Miyashita ................ 455/550.1 |

FOREIGN PATENT DOCUMENTS

| FR | 2738070 A1 | * | 2/1997 |
| JP | 7-295740 | | 11/1995 |
| JP | 8-292835 | | 11/1996 |
| JP | 9-261311 | | 10/1997 |
| JP | 9-298606 | | 11/1997 |
| JP | 9-321848 | | 12/1997 |
| JP | 11-17791 | | 1/1999 |

* cited by examiner

*Primary Examiner*—Matthew Anderson
*Assistant Examiner*—Eugene Yun
(74) *Attorney, Agent, or Firm*—Foley & Lardner LLP (57) ABSTRACT

An input apparatus allowing the improved operability of data entry without noticeable volume changes of a portable device itself and further allowing easy entry of a positional coordinate, a curve, and the like is disclosed. The input apparatus is detachably coupled to the portable device and is provided with a coordinate information generator for generating coordinate information depending on a movement on a flat surface to control a position of a cursor on a display of the portable device. Therefore, the input apparatus is removed from the portable device and the singly input apparatus can output coordinate information to the portable device by sliding it on a desk. The input apparatus preferably incorporates a battery for supplying power to the portable device when the input apparatus is coupled to the portable device.

12 Claims, 9 Drawing Sheets

PORTABLE INFORMATION INPUT APPARATUS

CROSS-REFERENCE TO RELATED PATENT APPLICATIONS

This application is a continuation of application Ser. No. 09/625,052, filed Jul. 24, 2000, now pending, and based on Japanese Patent Application No. 11-208312, filed Jul. 23, 1999, by Toshikazu Miyashita. This application claims only subject matter disclosed in the parent application and therefore presents no new matter.

BACKGROUND OF THE INVENTION

1. Field of the invention

The present invention relates to an information input apparatus suitable for a compact device, and in particular to a portable information input apparatus for use in a portable information processing device such as a portable telephone terminal.

2. Description of the related art

There have been proposed and put into practical use various methods for inputting data to an information processing device such as a personal computer, a portable telephone set or the like. In the case of an information processing device relatively large in size like an ordinary desktop personal computer, a keyboard is often used for data entry. On the contrary, when it comes to a small information processing device like a portable telephone set, it is rather inconvenient from the viewpoint of portability to use a relatively large input apparatus like a keyboard even for entering characters.

Therefore, in such a compact size information processing device, a data entry method using a keypad and a display disposed in the main body of an apparatus has been employed in many cases. In such an information processing device, however, the keypad itself tends to have only a minimum number of keys required. Consequently, in the case where the number of characters to be used is larger than that of the keys on the keypad, a plurality of characters need to be allocated to one particular key. Therefore, some characters need to be selected and input by depressing a corresponding key the specified number of times. For example, to select a small letter "c" in the alphabet, the particular key allocated to the letters A, B and C is to be sequentially depressed to display "A", "B", "C", "a", "b", and "c" in this order on a display unit. Then, at the time when the aimed letter "c" is displayed, the selection of one letter is completed. As a result, the entry of a plurality of letters constituting a name, an address or the like necessitates the complicated operation of the keypad, which has been a problem of notably low efficiency in data input processes.

There are two kinds of letters in the Japanese syllabary and each of them has 48 phonograms, which means there are 96 phonograms in total. Therefore, compared with English having 52 letters including the capital letters, the complexity of data entry of Japanese letters with the restricted numbers of keys on keypad is more significant.

Thus, for the compact information processing device of a certain kind, the incorporation of a wireless device such as an infrared transmission device or the like in its main body has been contrived. In such a device, merely by setting the compact information processing device in a wireless communication mode, data prepared in advance by using a computer or the similar type of device can be entered by wireless such as infrared rays or the like.

For example, in a system disclosed in Japanese Patent Application Unexamined Publication No. 9-298606, a radio base station is connected to a desktop computer by a cable and is further connected to a portable unit by radio. Accordingly, if data is entered beforehand to the desktop computer by using input means such as its keyboard or the like, then the data can be easily sent out to the portable unit by radio.

However, the wireless data entry method disclosed in the Publication No. 9-298606 is effective only under an environment where a device such as a desktop computer that is relatively large in size and easy for data entry can be used as an information input apparatus. Accordingly, in the case where new data entry is required outside an office, that is, under such an environment where a desktop computer is not available, such data needs to be created by using the concerned information processing device. This means that such data cannot be input without the above-described data entry method using a keypad and a display disposed in the main body of concerned information processing device, resulting in the difficulty of achieving an efficient operation.

Despite the recent progress in the miniaturization of an information processing device, the displaying contents on the display unit has been required wider and more complexed, and such forms of usage as on-line banking and as searching and obtaining information has been widely used. Under such circumstances, the method of performing data entry or operational designation using the keypad has been unsatisfactory in operability and thus a great obstacle to efficient information processing. Apparently, as far as data entry is concerned, an efficient operation can be performed by radio, but the information processing device itself needs to be provided with a circuitry for such wireless communications. In the case of a compact information processing device, in particular, it has been difficult to secure a space for the installation of such a circuitry.

Furthermore, in the conventional information input apparatus, it was practically impossible to enter handwritten characters by moving the cursor or to manually enter a positional coordinate, a curve, and the like.

SUMMARY OF THE INVENTION

It is therefore an object of the present invention to provide a portable information input apparatus and a portable device capable of improving the operability of data entry without noticeable volume changes of the portable device itself.

It is another object of the invention to provide an information input apparatus capable of facilitating the entry of a positional coordinate, a curve, and the like.

In order to achieve the above-described objects, according to an aspect of the present invention, an input apparatus for inputting information to an information processing device provided with a display, includes: a coupling mechanism for detachably coupling to a predetermined portion formed in the information processing device; a coordinate information generator for generating coordinate information depending on a movement on a flat surface to control a position of a cursor on the display of the information processing device; and a cable for electrically connecting the input apparatus to the information processing device.

The input apparatus preferably further includes a battery accommodating portion for accommodating a battery which is used to supply power to the information processing device when the input apparatus is coupled to the predetermined portion of the information processing device by the coupling mechanism.

The input apparatus may further include an electric contact portion for electrically connecting the battery to the information processing device when the input apparatus is coupled to the predetermined portion of the information processing device by the coupling mechanism.

The information processing device may include a secondary battery, which is charged by the battery of the input apparatus when the input apparatus is coupled to the predetermined portion of the information processing device by the coupling mechanism.

The cable may be pulled out from a rewinding mechanism provided in the information processing device when the input apparatus is removed from the predetermined portion of the information processing device.

The input apparatus may further include a connector connected to one end of the cable, for detachably connecting to the information processing device through the cable; and a cable accommodating space formed in the input apparatus, for accommodating the cable with the connector therein.

The input apparatus may further include at least two buttons which each functions as right-click and left-click buttons of a mouse when the input apparatus is separated from the predetermined portion of the information processing device and functions as right cursor key and left cursor key when the input apparatus is coupled to the predetermined portion of the information processing device by the coupling mechanism.

According to another aspect of the present invention, a portable telephone apparatus includes: a display; an information processing device; an input device for inputting coordinate information to the information processing device to control a position of a cursor on the display, the coordinate information varying depending on a movement on a flat surface; and a coupling mechanism for detachably coupling the input device to a predetermined portion of the portable telephone apparatus.

The input device may include a battery accommodating portion for accommodating a battery which is used to supply power to the information processing device when the input device is coupled to the predetermined portion of the portable telephone apparatus by the coupling mechanism.

The input device may have a first electric contact portion and the predetermined portion of the portable telephone apparatus has a second electric contact portion, wherein the first and second electric contact portions are electrically connected to each other when the input device is coupled to the predetermined portion by the coupling mechanism.

The portable telephone apparatus may include a secondary battery, which is charged by the battery of the input device when the input device is coupled to the predetermined portion by the coupling mechanism.

The coordinate information may be transferred from the input device to the information processing device through a cable. The coordinate information may be transferred from the input device to the information processing device by wireless.

The information processing device may control the input device so that it functions as a keypad of the portable telephone apparatus when the input device is coupled to the predetermined portion by the coupling mechanism and functions as a pointing device when the input device is not coupled to the predetermined portion.

As described above, the input apparatus is detachably coupled to the predetermined portion formed in the information processing device by the coupling mechanism and is provided with the coordinate information generator for generating coordinate information depending on a movement on a flat surface to control a position of a cursor on the display of the information processing device. Therefore, the input apparatus is removed from the information processing device and the singly input apparatus can output coordinate information to the information processing device by sliding it, as a mouse, on a desk. This allows the improved operability of data entry without noticeable volume changes of the portable device itself and further allows easy entry of a positional coordinate, a curve, and the like.

Further, the input apparatus preferably includes a battery accommodating portion. A battery accommodated in the portion is used to supply power to the information processing device when the input apparatus is coupled to the information processing device. Since the battery is accommodated in the input apparatus, space saving is achieved in the case where the input apparatus is coupled to the information processing device.

DETAILED DESCRIPTION OF THE PREFERRED EMBODIMENTS

Next, the preferred embodiments of the present invention will be described with reference to the accompanying drawings.

First Embodiment

Figure 1:
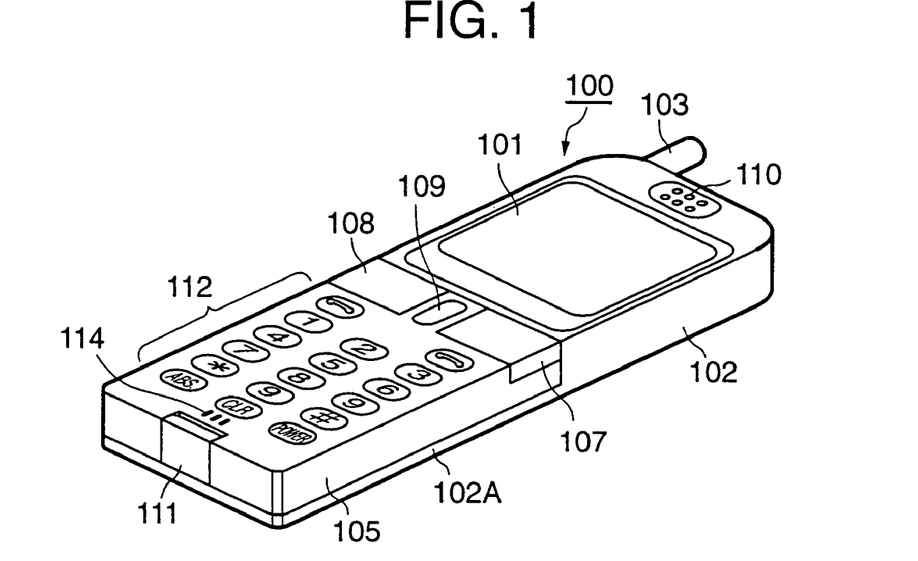
FIG. 1 is a perspective view showing an appearance of a portable telephone set equipped with an input apparatus according to a first embodiment of the present invention.

Referring to FIG. 1, a portable telephone set denoted by reference numeral 100 comprises a telephone set main body 102 having a display unit 101 disposed in its front face. The telephone set main body 102 includes an antenna 103 disposed in its upper end portion so as to be freely expanded/contracted.

An operation unit 105 capable of functioning as a pointing device (here, a mouse) is detachably coupled to a level difference portion 102A located one-step lower in the telephone set main body 102. Right and left buttons 107 and 108 corresponding to right and left buttons of an ordinary mouse are disposed in the upper end portion of the front face of the operation unit 105. Further, the operation unit 105 is provided with a rotary wheel 109 located in the center portion thereof and a part of the rotary wheel 109 is protruded from the front face of the operation unit 105.

An operation unit locking mechanism 111 is attached near the lower end portion of the operation unit 105. The operation unit locking mechanism 111 is capable of holding the operation unit 105 on the level difference portion 102A to prevent its falling-off. In the remaining portion of the front face of the operation unit 105, as in the case of an ordinary portable telephone set, a keypad 112 composed of various keys including ten keys is disposed. Between the keypad 112 and the operation unit locking mechanism 111, a microphone hole 114 is bored to enter a voice of a user.

In the case of the operation unit 105 united with the telephone set main body 102 as shown in FIG. 1, the operation unit 105 allows all the normal operations of a telephone set. In this state, however, pressing of the right and left buttons 107 and 108 of the mouse cannot bring about the above-described functions. In addition, the coupling of the operation unit 105 with the level difference portion 102A prevents the operation unit 105 from horizontal movement independently with the telephone set main body 102. Consequently, the operation unit 105 cannot provide the function of instructing a cursor direction as a mouse.

The portable telephone set 100 includes a speaker hole 110 bored near the tip above the display unit 101 to output a voice. From this hole, a voice of a communication party, necessary voice guidance, and so on, are outputted.

Figure 2:
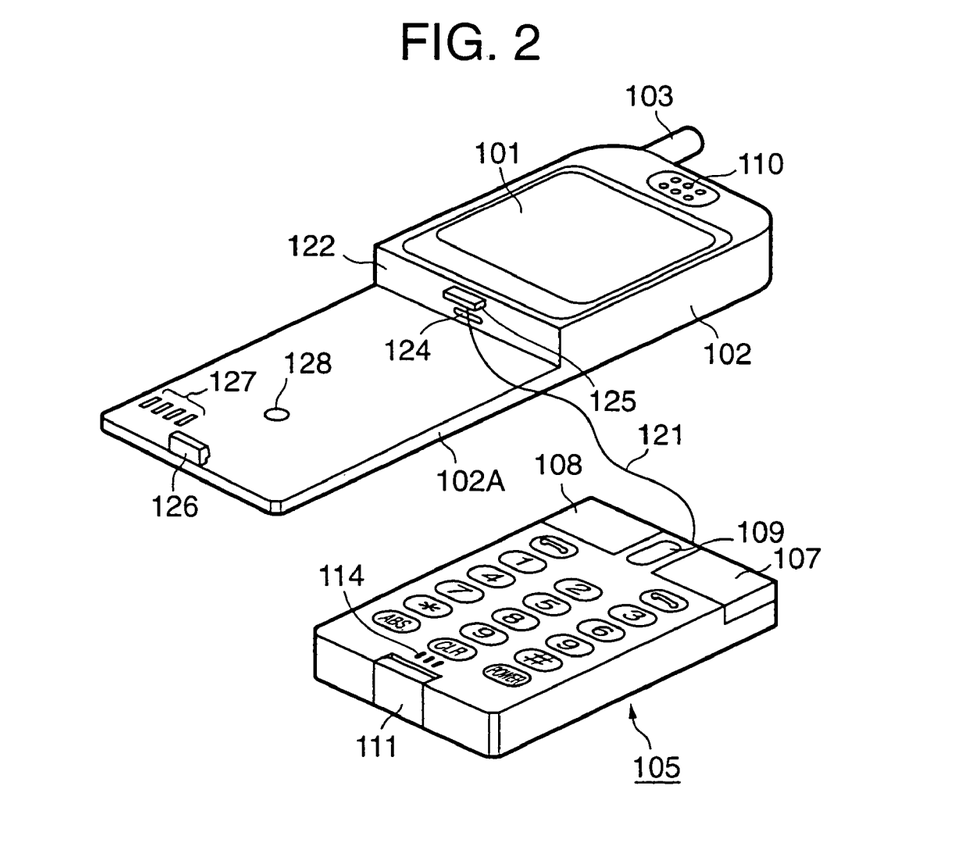
FIG. 2 is a perspective view showing an operation unit taken out of the portable telephone set and placed on a desk according to the first embodiment.

FIG. 2 shows the case where the operation unit 105 is taken out of the above-described portable telephone set and is placed on a desk. One end of a thin but strong mouse cable 121 is attached to the head of the operation unit 105. The other end of the mouse cable 121 is pulled out of a cable outlet 124 bored almost in the center part of a partition wall 122, which is in contact with one end of the level difference portion 102A. Inside the cable outlet 124, a rewinding mechanism (not shown) is provided for rewinding the mouse cable 121. This rewinding mechanism has a well-known function of locking or holding the mouse cable 121 pulled out by a desired length. In addition, by pulling the mouse cable 121 in a particular angular direction, this locked state is released to enable the rewinding mechanism to rewind the cable completely. Accordingly, the mouse cable 121 can be pulled out by a length requested by the user for use, and after a desired operation using the operation unit 105 has been completed, the mouse cable 121 can be completely contained in the telephone set main body 102. A first projection portion 125 is protruded from the partition wall 122 immediately above the cable outlet 124.

The level difference portion 102A has a second projection portion 126 formed at a position thereof corresponding to the operation unit locking mechanism 111. The second projection portion 126 is protruded from the face of the level difference portion 102A to lock the operation unit 105. The second projection portion 126 has a tapered shape as if the arrow shape is cut by half along the centerline in axial direction. In the vicinity of the second projection portion 126, a group of electrodes 127 is disposed to be supplied with power from the operation unit 105 and exchange signals with the operation unit 105.

A main portion inside the operation unit 105 is used to accommodate a charging battery (not shown), which is designed to supply power to the telephone set main body 102 through the group of electrodes 127. The charging battery may be a secondary (rechargeable) battery. However, the telephone set main body 102 has a relatively small-capacity secondary battery (not shown) disposed therein to be charged by the charging battery accommodated in the operation unit 105. While the operation unit 105 is separated from the level difference portion 102A, this secondary battery supplies power to the display unit 101 and other necessary circuits, allowing the operation result of the operation unit 105 to be input and displayed on the display unit 101.

The level difference portion 102A also includes an operation unit detecting sensor 128 disposed on its upper surface. The operation unit detecting sensor 128 is provided to detect the setting of the operation unit 105 on the level difference portion 102A and, in the described embodiment, a pressure detecting sensor is used. An on/off switch operating depending on the setting of the operation unit 105 on the level difference portion 102A may be used as the pressure detecting sensor. Not only the pressure type but also various other sensor types may be used.

The functions of key switches and buttons may be changed depending on whether the operation unit 105 is used as a single mouse or as a part of the portable telephone set 100, and also some of the functions may be inhibited depending on the use status. Thus, the presence and absence of the operation unit 105 needs to be detected.

Figure 3:
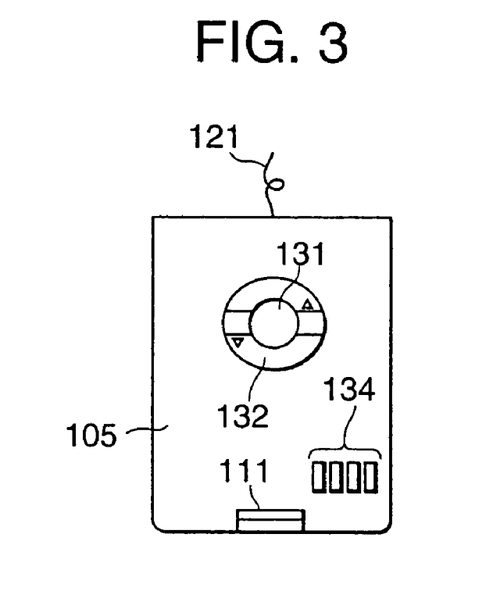
FIG. 3 is a backside view of the operation unit as the input apparatus according to the first embodiment.

FIG. 3 shows the backside of the operation unit used as an input apparatus. The operation unit 105 functions as a mouse, and therefore includes a track ball 131 rotatably contained to detect a moving direction. The surface of the track ball 131 is gradually stained as it is used and, thus, a track ball removing plate 132 is provided to enable the track ball to be removed and cleaned. The track ball removing plate 132 can be removed from the operation unit 105 by rotating it in a predetermined direction. In this removed state, the track ball 131 may also be removed, and the inside of the operation unit 105 may be cleaned.

The operation unit 105 also includes, in its backside, the operation unit locking mechanism 111 engaged with the second projection portion 126 shown in FIG. 2, and a group of electrodes 134 respectively connected to the electrodes 127.

Figure 4:
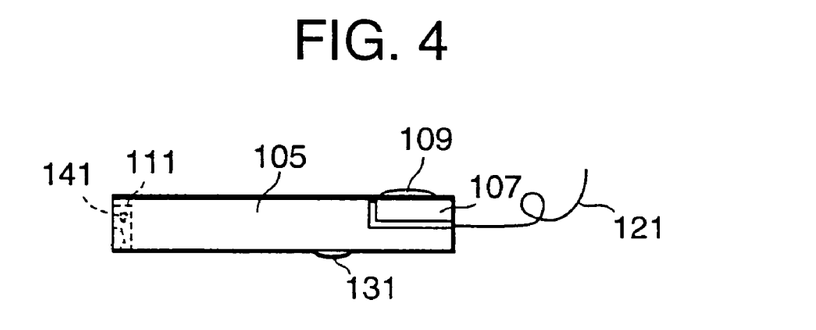
FIG. 4 is a side view of the operation unit when it is singly lifted according to the first embodiment.

FIG. 4 shows the side face of the operation unit when it is singly lifted. A part of the track ball 131 is exposed from the lower end surface of the main body of the operation unit 105. In addition, a part of the rotary wheel 109 is protruded from the upper end surface. In the case of the single use of the operation unit 105, the rotary wheel 109 is used when an additional instruction is made to scroll a screen displayed on the display unit 101 or the like. Depending on the constitution of the operation unit 105 as the input apparatus, the rotary wheel 109 may be omitted.

The operation unit locking mechanism 111 indicated by a broken line in FIG. 4 is provided to the rear end portion of the operation unit 105 opposite its tip portion where the mouse cable 121 has been pulled out. The operation unit locking mechanism 111 is supported by the main body of the operation unit 105 so that it is rotatable around a spindle 141 vertically disposed on the paper surface of the drawing.

Figure 5:
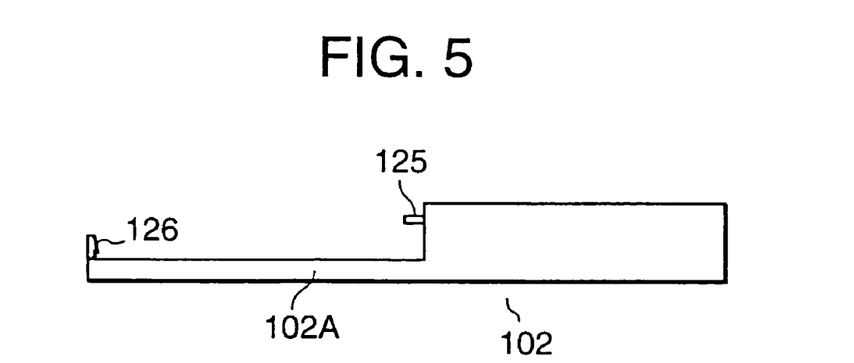
FIG. 5 is a side view showing a side face of a telephone set main body when the operation unit is removed according to the first embodiment.

FIG. 5 shows the side face of the main body of the telephone set with the operation unit removed. The first and second projection portions 125 and 126 are protruded in a space of the telephone set main body 102 for containing the operation unit 105 as shown in FIG. 4. The user fits the first projection portion 125 into a concave (not shown) formed in the tip portion of the operation unit 105, and presses the rear end portion toward the level different portion 102A. This causes the operation unit locking mechanism 111 to be rotated by a predetermined angle against a spring mechanism (not shown) to engage the second projection portion 126. As a result, the operation unit 105 is fixed to the telephone set main body 102 as shown in FIG. 1.

Conversely, when the operation unit 105 is to be removed from the telephone set main body 102, the upper end portion of the operation unit locking mechanism 111 is moved toward the outside by finger against the spring mechanism. This causes the second projection portion 126 to be unlocked. By lifting the rear end portion of the operation unit 105 in the unlocked state of the second projection portion 126, the operation unit 105 can be separated from the telephone set main body 102.

The telephone set main body 102 shown in FIG. 1 includes a program-controlled processor such as a central processing unit (CPU, not shown), and the functions of a portable telephone set are realized by a program stored in a read-only memory (ROM, not shown) running on the CPU. When the operation unit 105 is operated, the input processing mode is varied depending on whether the operation unit detecting sensor 128 has detected the operation unit 105 or not.

To detect the setting of the operation unit 105 on the level difference portion 102A, a sensor may be provided to detect the rotation of the operation unit locking mechanism 111. Based on the detecting result of this sensor, determination may be made as to the setting of the operation unit 105 in the level difference portion 102A.

Figure 6:
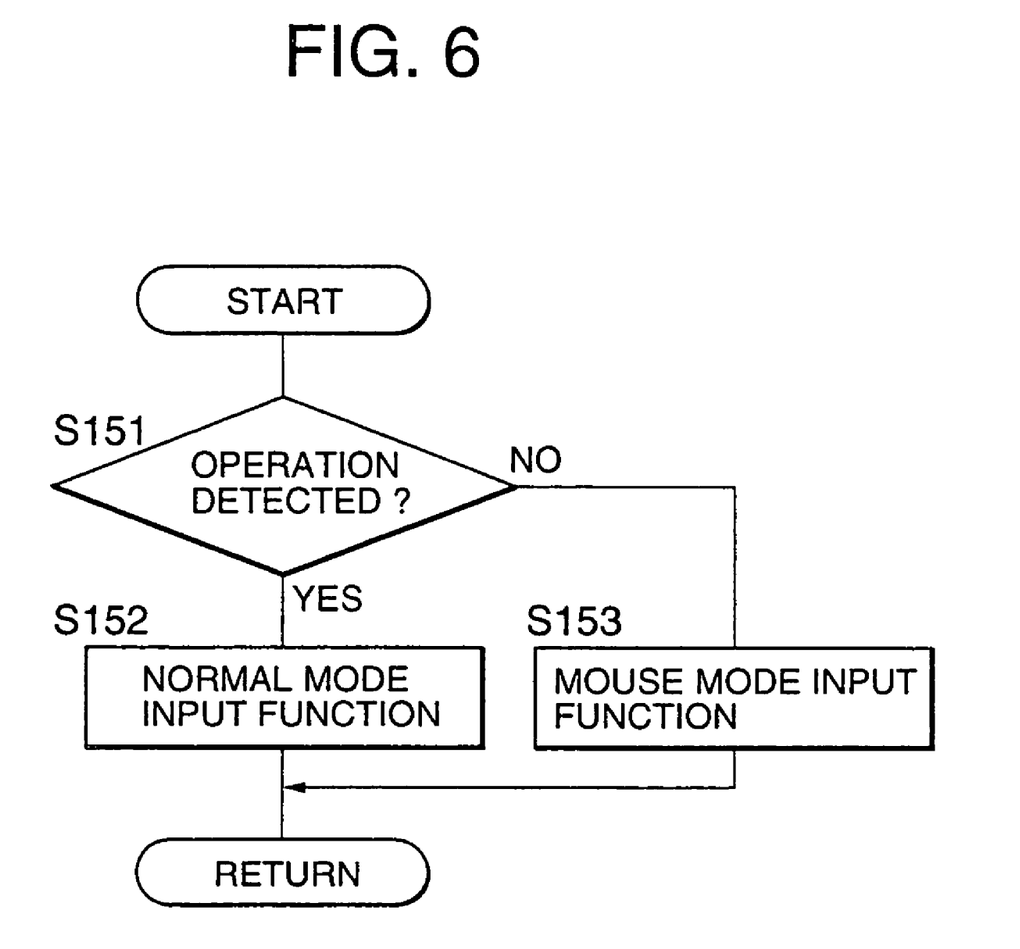
FIG. 6 is a flow chart showing an input mode switch operation in the portable telephone set according to the first embodiment.

FIG. 6 shows the outline of switching control steps for the input mode of the operation unit provided in the portable telephone set according to the described embodiment. When it is determined that the operation unit detecting sensor 128 shown in FIG. 2 has detected the operation unit 105 (YES at step S151), the operation mode of the operation unit 105 is set to the normal mode of the telephone set (step S152). On the other hand, when it is determined that the operation unit detecting sensor 128 shown in FIG. 2 has not detected the operation unit 105 (NO at step S151), the operation mode of the operation unit 105 is set to a mouse mode using the operation unit 105 as a mouse.

In the mouse mode, a function of detecting an operation performed by one of the right and left buttons 107 and 108 and the rotary wheel 109 of the operation unit 105 becomes active. Two-dimensional information associated with movement of the operation unit 105 detected by the rotation of the track ball 131 shown in FIG. 3 and so on, also becomes active. These kinds of information are sent out through the mouse cable 121 to the telephone set main body 102. On the other hand, since the keypad 112 such as ten keys or the like is not needed in a usual mouse operation, even when these keys are depressed, information generated by such a key operation is ignored in the telephone set main body 102.

However, some users may be desired to use parts or all of the keypad 112 such as ten keys even in the singly use state of the operation unit 105. In such a case, the use of these keys may be permitted under certain conditions. For example, if a "0" key and a "#" key are simultaneously depressed, the depressing of the keypad 112 entered within a predetermined time period thereafter may be validated. Or if the "0" key and the "#" key are simultaneously depressed, the depressing of the keypad 112 may be validated until the rotation of the track ball 131 is commenced again. In this way, the burdensome work of attaching the operation unit 105 to the telephone set main body 102 may be eliminated in every occasion when the various key operations are required.

In the normal mode, the similar input processing will be implemented as the case where the operation unit 105 is firmly attached to the telephone set main body 102. A problem inherent in this case is how to handle the right and left buttons 107 and 108 and the rotary wheel 109. The input processing of these three input sections may be ignored in the normal mode, or functions different from those in the mouse mode may be allocated to these input sections. For example, the rotary wheel 109 may be used as an execution key, and the right and left buttons 107 and 109 may be used respectively as right-direction and left-direction cursor keys.

FIRST MODIFIED EXAMPLE

Figure 7:
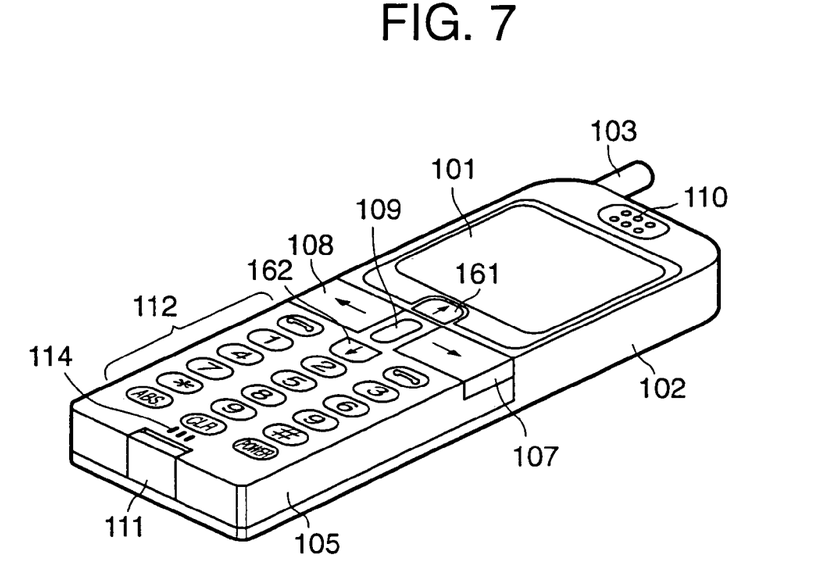
FIG. 7 is a perspective view showing a portable telephone set according to a first modified example of the first embodiment.

FIG. 7 shows a first modified example of the first embodiment of the invention. In FIG. 7, members similar to those described with reference to FIG. 1 are denoted by the same reference numerals, and the descriptions thereof will be omitted. In the first modified example, an upper-direction cursor key 161 is disposed immediately below the display unit 101 of the telephone set main body 102. A lower-direction cursor key 162 is also disposed adjacently to the rotary wheel 109 included in the keypad 112 of the operation unit 105. These upper-direction and lower-direction cursor keys 161 and 162 are not functioned in the mouse mode but in the normal mode. In this case, the right and left buttons 107 and 108 are used respectively as right-direction and left-direction cursor keys.

FIRST MODIFIED EXAMPLE

Figure 8:
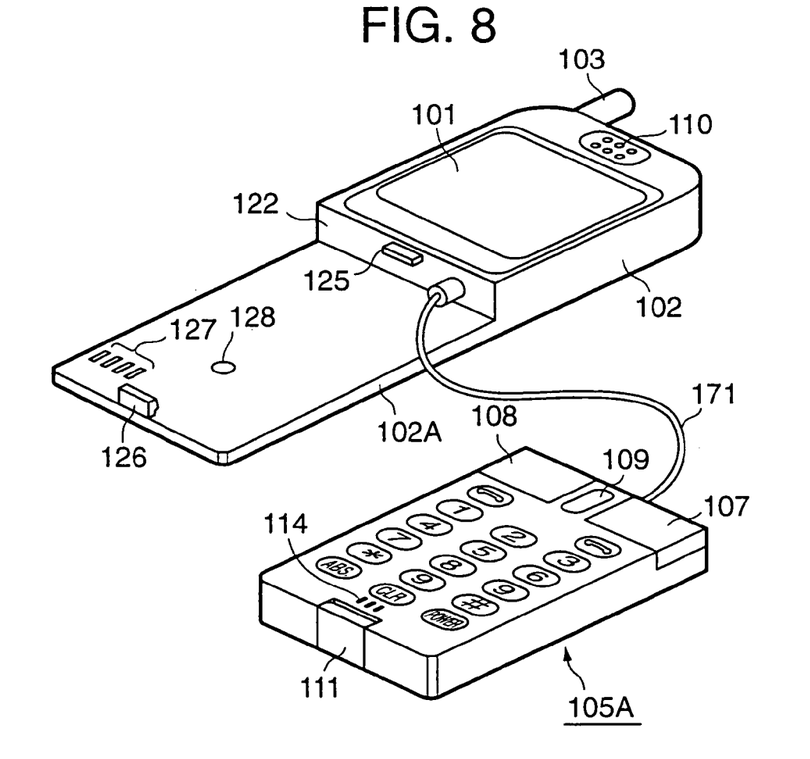
FIG. 8 is a perspective view showing an operation unit and a telephone set main body with the operation unit removed according to a second modified example of the first embodiment.

FIG. 8 shows a second modified example of the first embodiment of the invention. In FIG. 8, members similar to those described with reference to FIG. 2 are denoted by the same reference numerals, and the descriptions thereof will be omitted. In the second modified example, an operation unit 105A has a cable 171 connected thereto and the cable 171 has a first connector 172 connectable to the telephone set main body 102. Therefore, the telephone set main body 102 and the operation unit 105A are connected to each other by the cable 171.

Figure 9:
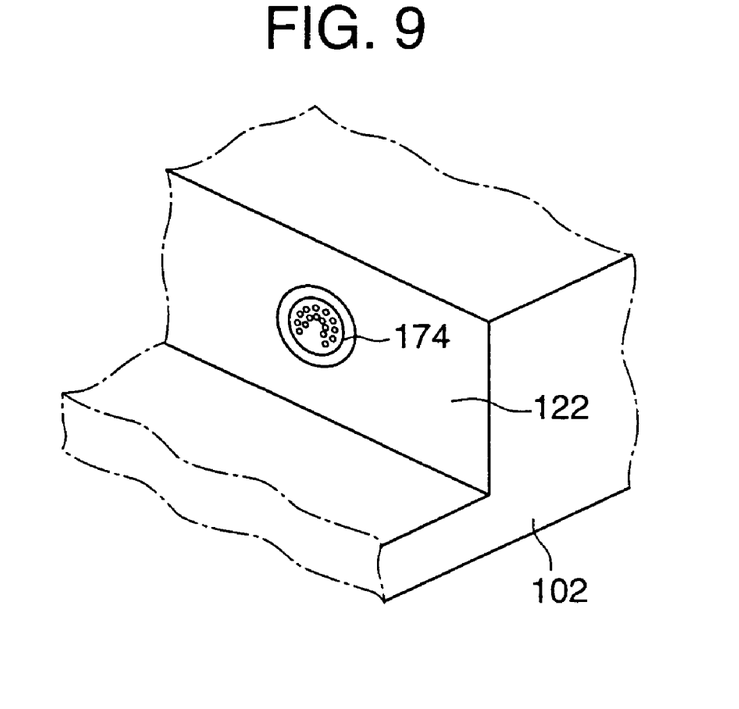
FIG. 9 is a magnified perspective view showing a partition wall of the second modified example.

As shown in FIG. 9, in the second modified example, a second connector 174 is disposed in the partition wall 122. The connection of the first connector 172 to the second connector 174 allows not only a power-supply line connection but also a signal line connection between the telephone set main body 102 and the operation unit 105A.

Figure 10:
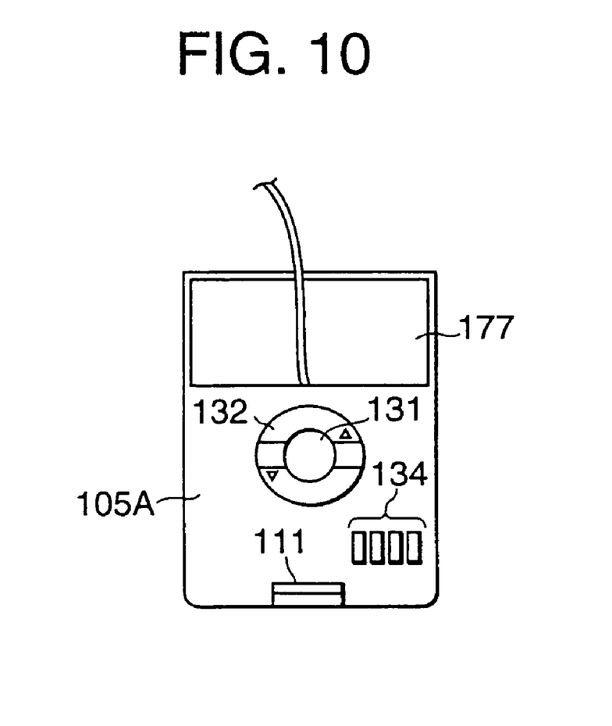
FIG. 10 is a backside view of the operation unit of the second modified example.

FIG. 10 shows the backside of the operation unit in the second modified example. In FIG. 10, members similar to those described with reference to FIG. 3 are denoted by the same reference numerals, and the descriptions thereof will be omitted. As shown in FIG. 10, a relatively large space portion 177 is disposed in the backside of the operation unit 105A. When the operation unit 105A is mounted and fixed on the level difference portion 102A, the cable 171 and the first connector 172 pulled out of the second connector 174 are contained in the space portion 177.

According to the second modified example, the cable 171 may be used for transmitting not only a mouse control signal but also other signals. Thus, without providing any special power source or charging battery in the telephone set main body 102, it is possible to enter necessary information, e.g., positional information, by moving the operation unit 105A while displaying the display unit 101.

Second Embodiment

Figure 11:
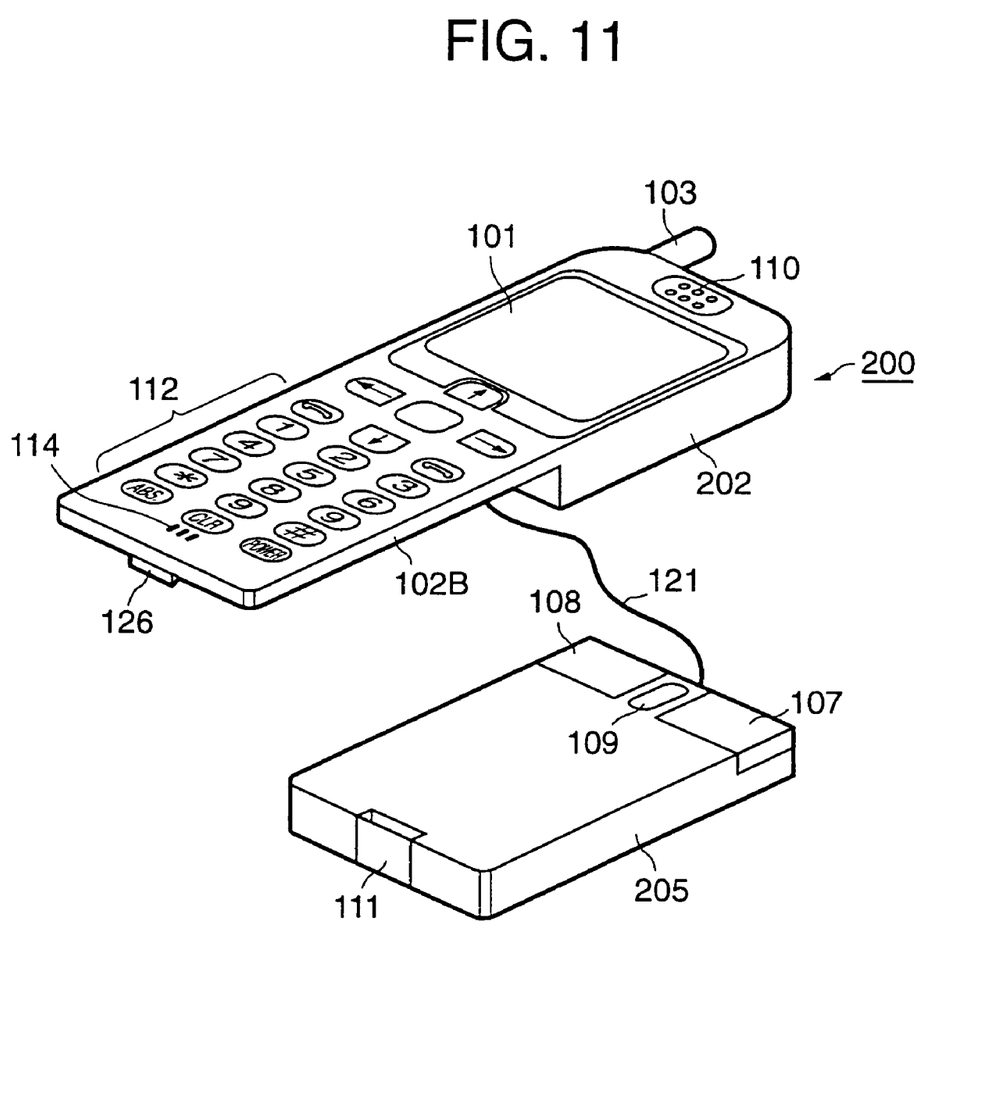
FIG. 11 is a perspective view showing a use status of an operation unit separated from a portable telephone set main body according to a second embodiment of the invention.

FIG. 11 shows a use status of an operation unit removed from a portable telephone set main body according to a second embodiment. In FIG. 11, members similar to those described with reference to FIG. 1 are denoted by the same reference numerals, and the descriptions thereof will be omitted.

A portable telephone set denoted by a reference numeral 200 has a telephone set main body 202 including the display unit 101 disposed in the front face. In the upper end portion of the telephone set main body 202, the antenna 103 is disposed so as to be freely expanded/contracted.

A bottom portion below an operation region having the keypad 112 of the telephone set main body 202 disposed therein is hollowed, constituting a thin operation plate 102B having a space to accommodating a mouse unit 205 incorporating a battery. The mouse unit 205 is turned upside down and then fixed to the operation plate 102B. Accordingly, in the second embodiment, the disposition of various keys such as ten keys in the mouse unit 205 is not always necessary, and it is enough to dispose one or more buttons like the right and left buttons 107 and 108. In the embodiment, as in the case of the first embodiment, the rotary wheel 109 is provided in addition to the right and left buttons 107 and 108 of the mouse.

Third Embodiment

Figure 12:
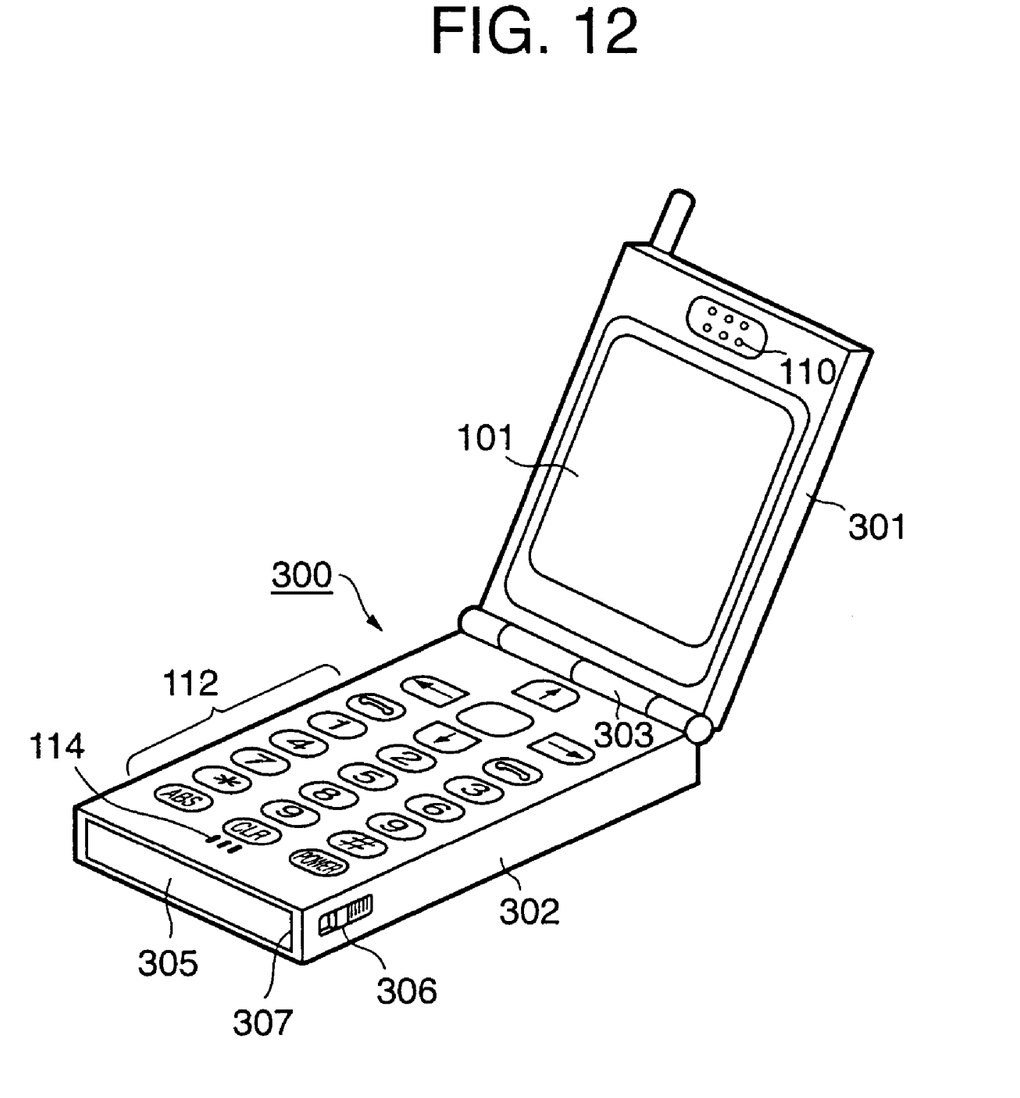
FIG. 12 is a perspective view showing an appearance of a portable telephone set using an input apparatus according to a third embodiment of the invention.

FIG. 12 shows the appearance of a portable telephone set using an input apparatus according to a third embodiment of the invention. In the third embodiment, members similar to those described with reference to FIG. 1 are denoted by the same reference numerals, and the descriptions thereof will be omitted.

A portable telephone set 300 according to the third embodiment has a first telephone set main body 301 including the display unit 101 and the speaker hole 110, and a second telephone set main body 302 including keypad 112 such as ten keys, a microphone hole 114, and so on. These first and second main bodies 301 and 302 are connected to each other by a hinge mechanism 303 so as to be freely opened/closed.

The second telephone set main body 302 has a hollow portion 307 formed inside extending toward the hinge mechanism 303 to accommodate a mouse 305 incorporating a battery. Therefore, the portable telephone set 300 can be carried in a state where the mouse 305 is inserted into the hollow portion 307. In the side portion of the second telephone set main body 302, a latch releasing slider 306 is disposed so as to freely slide. The mouse 305 incorporating the battery is latched by a latch mechanism (not shown) when it is inserted the full depth into the hollow portion 307 of the second telephone set main body 302. Accordingly, to take out the mouse 305 incorporating the battery again, the latch releasing slider 306 needs to be slid to release latching.

Figure 13:
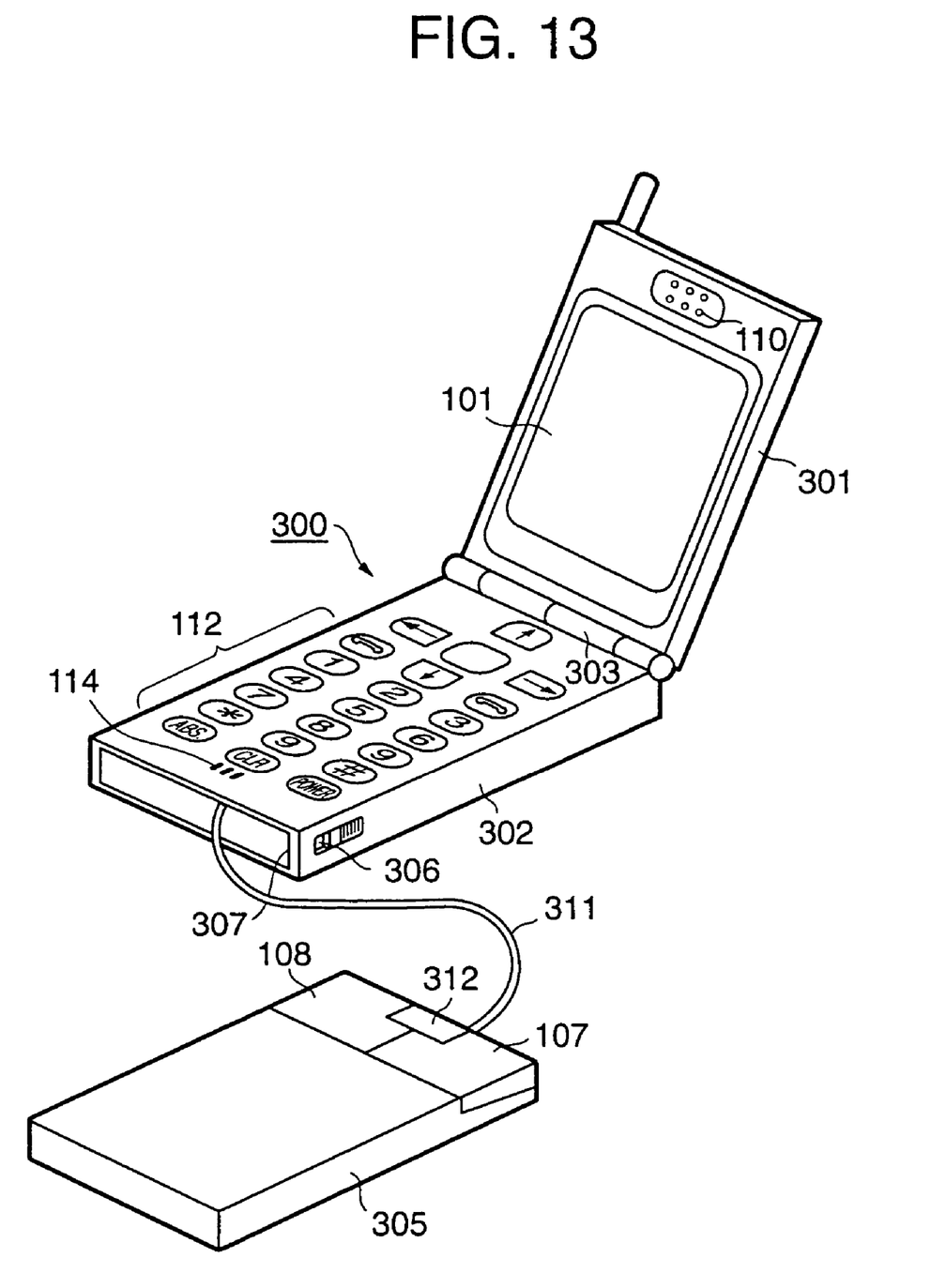
FIG. 13 is a perspective view showing an operation of a mouse incorporating a battery, which is pulled out of a second telephone set main body according to the third embodiment.

FIG. 13 shows the use state of the mouse incorporating the battery as a pointing device, which is pulled out of the second telephone set main body of the third embodiment. When pulled out directly from the hollow portion 307, the mouse 305 incorporating the battery can be moved freely on the desk within the length of a cable 311, enabling the entry of coordinate data. In the tip of the mouse 305 incorporating the battery, a latch mechanism 312 is attached to perform latching inside the second telephone set main body 302.

Figure 14:
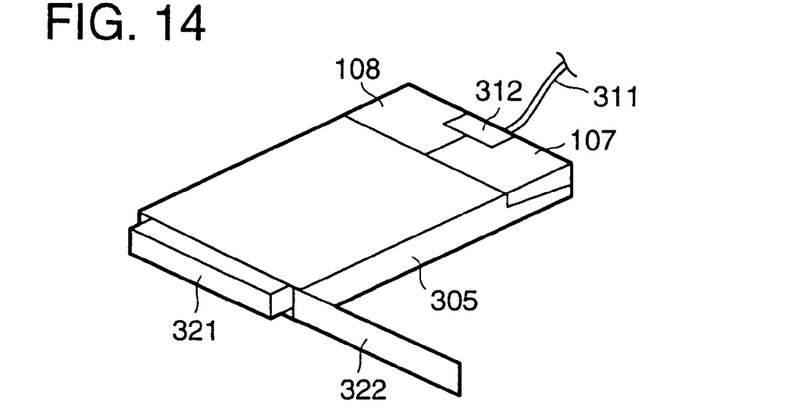
FIG. 14 is a perspective view showing a process of removing the battery from the mouse according to the third embodiment.

FIG. 14 shows the process of removing the battery from the mouse incorporating the battery of the embodiment. The mouse 305 incorporating the battery may include a group of electrodes 134 (as shown in FIG. 10) disposed in its outside. Therefore, by setting the mouse 305 in a charger (not shown), it is possible to charge the battery included in the mouse 305. In the third embodiment, however, the battery is taken out of the mouse 305 and is charged. The battery denoted by a reference numeral 321 is taken out by sliding a battery cover 322 located in the rear end portion of the main body of the mouse 305.

Figure 15:
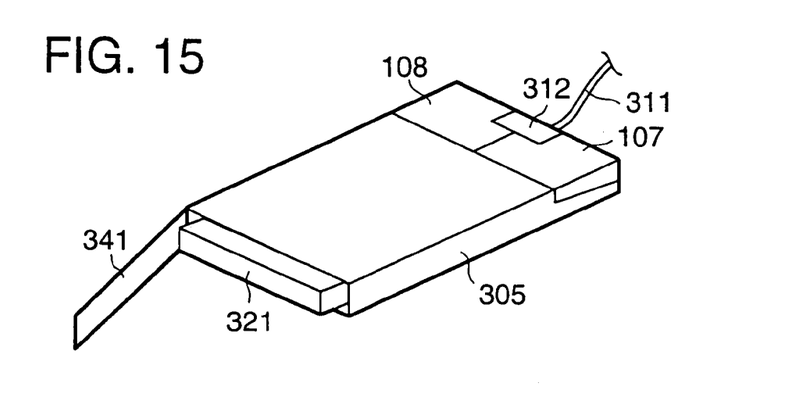
FIG. 15 is a perspective view showing another example of removing the battery from the mouse as a modification of the third embodiment.

FIG. 15 shows another exemplary mouse incorporating a battery. A battery cover 341 provided in the rear end portion of the main body of the mouse 305 incorporating the battery is freely opened/closed. In the open state of this cover 341, the battery 321 can be removed.

Fourth Embodiment

Figure 16:
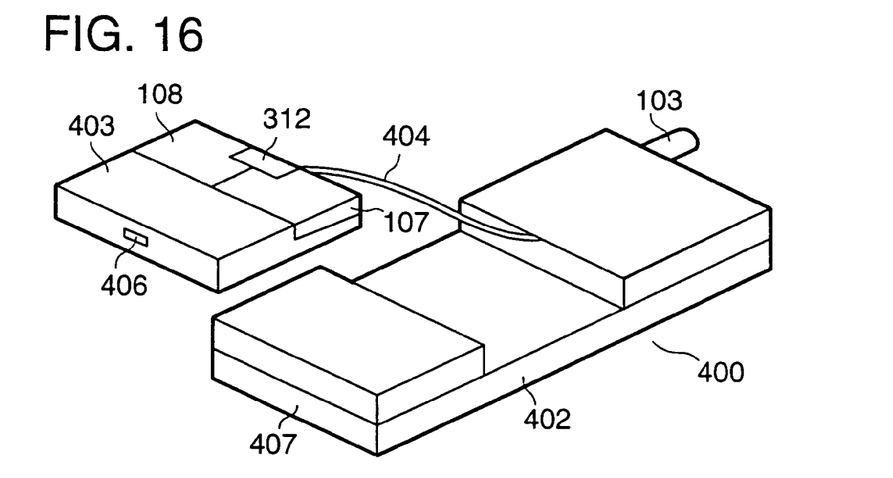
FIG. 16 is a perspective view showing an appearance of a portable telephone set using an input apparatus according to a fourth embodiment of the invention.

FIG. 16 shows the appearance of a portable telephone set using an input apparatus according to a fourth embodiment. In FIG. 16, members similar to those described with reference to FIG. 1 are denoted by the same reference numerals, and the descriptions thereof will be omitted.

A portable telephone set 400 according to the fourth embodiment includes a mouse unit 403 disposed in the center part of the backside of a telephone set main body 402. The mouse unit 403 contains a cable 404 freely fed to transmit a signal to the telephone set main body 402. A concave 406 is provided in the rear end portion of the mouse unit 403. The projection (not shown) of a battery 407 attached to the telephone set main body 402 is fitted in this concave 406 and latched by the latch mechanism 312, and thereby the mouse unit 403 is fixed to the telephone set main body 402. To remove the mouse unit 403, first, the latch mechanism 312 is released, and then the side portions of the right and left buttons 107 and 108 are gripped and lifted to the upper side shown in the drawing.

In the foregoing embodiments and the modified examples, the input apparatus as the pointing device and the information processing main body of the portable telephone set or the like are connected to each other by the cable. However, these can be connected by wireless using an infrared wave, and so on.

As apparent from the foregoing, the present invention is advantageous in the following respects.

First, the input apparatus incorporates the battery and is allowed to be removed from a main body of an information processing device. Further, the input apparatus includes coordinate information output means for outputting coordinate information to the main body of the information processing device. The coordinate information is generated by the input apparatus sliding on a flat plate such as the desk. Therefore, the space required for operations of the apparatus can be effectively utilized, contributing to the miniaturization of the apparatus.

Second, since the main body of the information processing device and the input apparatus are connected to each other by a cable, a communication device using infrared rays or the like may be eliminated, which enables the apparatus to be miniaturized and power consumption to be reduced.

Third, since the main body of the information processing device and the input apparatus are connected to each other by wireless, it is not necessary to provide any cable containing portions, and there is no possibility of disconnection.

Fourth, since the input unit is held to be freely detached in the portable telephone set, the removed use of the input unit facilitates the input processing of the portable telephone set, enabling a complex entry to be carried out quickly in combination with the display unit.

Fifth, the main body of the portable telephone set described above in the fourth respect includes a detecting means for detecting the setting of the input unit in the apparatus main body, and an input switching means for switching between the normal input mode and the pointing device input mode depending on whether the input unit is fixed to the apparatus main body. In other words, the input unit operates in the normal input mode when the input unit is attached to the portable telephone set, and operates in the pointing device input mode when the input unit has been removed from the apparatus main body. Accordingly, the functions of the input unit can be automatically switched depending on the presence and absence of the input unit in the apparatus main body.

What is claimed is:

1. A portable telephone apparatus comprising:
    a keypad for entering telephone numbers;
    a display for displaying entered telephone numbers;
    an input device having input sections for inputting coordinate information to the portable telephone apparatus to control a position of a cursor on the display, the coordinate information varying depending on a movement of the input device on a flat surface;
    a coupling mechanism for detachably coupling the input device to a handset of the portable telephone apparatus, said input device being removable from said handset for operation thereof to control the position of said cursor; and
    a detector to detect whether or not the input device is coupled to said handset, said input device operative to control a position of a cursor when said detector detects that said input device is not coupled to said handset,
    wherein the portable telephone apparatus controls the input device in response to the detector so that the input device functions only as said keypad of the portable telephone apparatus and so that input from the input sections for controlling the position of the cursor on the display is ignored when the input device is coupled to the handset of the portable telephone apparatus by the coupling mechanism and functions as a pointing device when the input device is not coupled to the handset of the portable telephone apparatus.

2. The portable telephone apparatus according to claim 1, wherein the input device comprises:
    a battery accommodating portion for accommodating a battery that supplies power to the portable telephone apparatus when the input device is coupled to the handset of the portable telephone apparatus by the coupling mechanism.

3. The portable telephone apparatus according to claim 1, wherein the input device has a first electric contact portion and the handset of the portable telephone apparatus has a second electric contact portion, wherein the first and second electric contact portions are electrically connected to each other when the input device is coupled to the handset by the coupling mechanism.

4. The portable telephone apparatus according to claim 1, wherein the coordinate information is transferred from the input device to the portable telephone apparatus through a cable.

5. The portable telephone apparatus according to claim 1, wherein the coordinate information is transferred wirelessly from the input device to the portable telephone apparatus.

6. The portable telephone apparatus according to claim 1, wherein the input device is a pointing device.

7. The portable telephone apparatus according to claim 6, wherein the pointing device is a mouse having at least a right-click key and a left-click key.

8. The portable telephone apparatus according to claim 1, wherein the portable telephone apparatus controls the input device in response to the detector so that the input device functions only as a pointing device when the input device is not coupled to the handset of the portable telephone apparatus.

9. A portable telephone apparatus comprising:
    a handset including a display;
    an input device having input sections;
    a coupling mechanism for detachably coupling the input device to the handset;
    a detector to detect whether the input device is coupled to the handset;
    a controller to control the input device in response to the detector so that the input device functions only as a keypad of the portable telephone apparatus and so that input from the input sections for controlling a position of a cursor on a display is ignored when the input device is coupled to the handset and functions as a pointing device to control the position of the cursor on the display when the input device is not coupled to the handset.

10. The portable telephone apparatus of claim 9, wherein the input device communicates wirelessly to the handset when the input device is not coupled to the handset.

11. The portable telephone apparatus of claim 9, wherein the input device communicates to the handset through a wire when the input device is not coupled to the handset.

12. The portable telephone apparatus according to claim 9, wherein the controller controls the input device in response to the detector so that the input device functions only as a pointing device to control a position of a cursor on the display when the input device is not coupled to the handset.

* * * * *